US009563563B2

(12) United States Patent
Auernhammer et al.

(10) Patent No.: US 9,563,563 B2
(45) Date of Patent: Feb. 7, 2017

(54) MULTI-STAGE TRANSLATION OF PREFETCH REQUESTS

(71) Applicant: International Business Machines Corporation, Armonk, NY (US)

(72) Inventors: Florian A. Auernhammer, Rueschlikon (CH); Patricia M. Sagmeister, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 626 days.

(21) Appl. No.: 14/065,700

(22) Filed: Oct. 29, 2013

(65) Prior Publication Data

US 2014/0156945 A1 Jun. 5, 2014

(30) Foreign Application Priority Data

Nov. 30, 2012 (GB) .................................. 1221580.2

(51) Int. Cl.
    G06F 3/00 (2006.01)
    G06F 13/00 (2006.01)
    G06F 12/08 (2016.01)
    G06F 12/10 (2016.01)

(52) U.S. Cl.
    CPC ........... *G06F 12/0862* (2013.01); *G06F 12/10* (2013.01); *G06F 12/1027* (2013.01); *G06F 2212/654* (2013.01)

(58) Field of Classification Search
    CPC ............ G06F 12/0862; G06F 2212/654; G06F 11/3485
    See application file for complete search history.

(56) References Cited

U.S. PATENT DOCUMENTS

| 7,487,297 | B2 | 2/2009 | El-Essawy et al. |
| 2005/0273310 | A1* | 12/2005 | Newburn ............ G06F 11/3409 703/17 |
| 2006/0248279 | A1* | 11/2006 | Al-Sukhni .......... G06F 12/0862 711/137 |
| 2006/0248280 | A1* | 11/2006 | Al-Sukhni .............. G06F 9/383 711/137 |
| 2012/0227045 | A1* | 9/2012 | Knauth ................. G06F 9/3863 718/100 |
| 2013/0166874 | A1 | 6/2013 | Auernhammer et al. |

FOREIGN PATENT DOCUMENTS

JP 2010217992 A 9/2010

* cited by examiner

*Primary Examiner* — Hyun Nam
(74) *Attorney, Agent, or Firm* — Cantor Colburn LLP; Keivan Razavi

(57) ABSTRACT

A device for multi-stage translation of prefetch requests includes a prefetch queue for providing queued prefetch requests, each of the queued prefetch requests including N different control entries; N serial-connected translation stages for the translation of N control entries of one of the queued prefetch requests into a translated prefetch request, wherein a translation in a i-th translation stage is dependent on a translation in a (i−1)-th translation stage, i∈[1, ..., N]; and a prefetch issuer which is configured to control an index for each of the N different control entries in the prefetch queue and to issue a prefetch of the indexed control entry of the N different control entries for the highest non-stalled translation stage.

15 Claims, 4 Drawing Sheets

MULTI-STAGE TRANSLATION OF PREFETCH REQUESTS

PRIORITY

This application claims priority to Great Britain Patent Application No. 1221580.2, filed Nov. 30, 2012, and all the benefits accruing therefrom under 35 U.S.C. §119, the contents of which in its entirety are herein incorporated by reference.

BACKGROUND

The invention relates to a device and to a method for multi-stage translation of prefetch requests. Such a device may be part of an I/O (Input/Output) controller. The I/O controller may be coupled to a processing unit, e.g., a CPU, and to a memory. The I/O controller may include an I/O link interface, an address translation unit and an I/O packet processing unit.

Following the trend for virtualization in processor cores, virtualization is finding increasing adoption in the I/O space as well. Together with the trend for network adapters to provide user-level-like queue based interfaces to the consumers, mainly used for providing each virtual machine running on the system with at least one private queue for interaction with the network device, I/O virtualization support in the I/O root complex, which is usually a PCI Express root complex, gains increasing importance. This requires the PCI Express Host Bridge (PHB) to provide address translation capabilities, such that different physical or virtual functions of a device can access their own virtual address space safely. This is becoming an increasing challenge with the increasing line speeds of PCI Express and the high parallelism used by I/O devices that creates little spatial locality in the requests from the device and thus increases the pressure on the root complex address translation unit.

At the same time, the translation caches of the root complex need to be small in order to be able to fit multiple root complexes on a processor to support a large number of links with different link configuration. The caches can also not be shared easily between PHBs as the attached devices usually do not share the same virtual domains and therefore require their own translations and caches. In addition, as mentioned above, virtualized devices in general show little spatial and temporal locality that would improve the efficiency of the translation unit cache.

U.S. Pat. No. 7,487,297 B2 describes a method and an apparatus for performing just-in-time data prefetching within a data processing system comprising a processor, a cache or prefetch buffer, and at least one memory storage device. The apparatus comprises a prefetch engine having means for issuing a data prefetch request for prefetching a data cache line from the memory storage device for utilization by the processor. The apparatus further comprises logic/utility for dynamically adjusting a prefetch distance between issuance by the prefetch engine of the data prefetch request and issuance by the processor of a demand (load request) targeting the data/cache line being returned by the data prefetch request, so that a next data prefetch request for a subsequent cache line completes the return of the data/cache line at effectively the same time that a demand for that subsequent data/cache line is issued by the processor.

JP 2010-217992 shows a cache controller, a cache control method and a cache control program.

In the European Patent Application 11195663.7, an I/O controller is described which is coupled to a processing unit and to a memory. The I/O controller includes an I/O link interface, an address translation unit, an I/O packet processing unit, and a prefetcher. The I/O link interface is configured to receive data packets having virtual addresses. The address translation unit includes an address translator for translating received virtual addresses into real addresses by translation control entries and a cache allocated to the address translator for caching a number of the translation control entries. The I/O packet processing unit is configured to check the data packets received at the I/O link interface and to forward the checked data packets to the address translation unit. The prefetcher is configured to forward address translation prefetch information from a data packet received at the I/O link interface to the address translation unit. Further, the address translator is configured to fetch the translation control entry for the data packet by means of the address translation prefetch information from the allocated cache or, if the translation control entry is not available in the allocated cache, from the memory. Thereby, translations from virtual addresses to real addresses may be prefetched, improving performance by reducing address translation miss stalls in the address translation unit in spite of little spatial locality of the addresses in the requests from I/O devices.

SUMMARY

In one embodiment, a device for multi-stage translation of prefetch requests includes a prefetch queue for providing queued prefetch requests, each of the queued prefetch requests including N different control entries; N serial-connected translation stages for the translation of N control entries of one of the queued prefetch requests into a translated prefetch request, wherein a translation in a i-th translation stage is dependent on a translation in a (i−1)-th translation stage, i∈[1, . . . , N]; and a prefetch issuer which is configured to control an index for each of the N different control entries in the prefetch queue and to issue a prefetch of the indexed control entry of the N different control entries for the highest non-stalled translation stage.

BRIEF DESCRIPTION OF THE SEVERAL VIEWS OF THE DRAWINGS

Similar or functionally similar elements in the figures have been allocated the same reference signs if not otherwise indicated.

DETAILED DESCRIPTION

Figure 1:
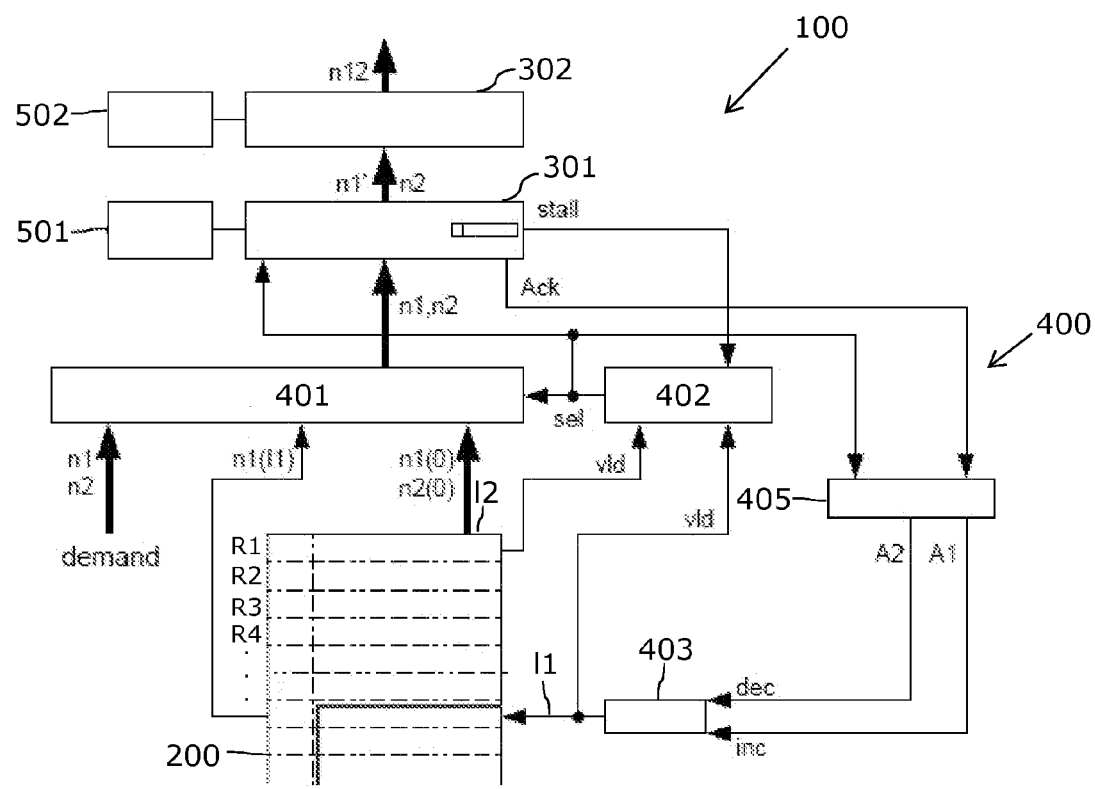
FIG. 1 shows a schematic block diagram of a first embodiment of a device for multi-stage translation of prefetch requests.

In view of the above, it is an aspect of the present invention to provide an improved prefetching scheme.

According to a first aspect, a device for multi-stage translation of prefetch requests is suggested. The device includes a prefetch queue for providing queued prefetch requests, each of the queued prefetch requests including N different control entries, N serial-connected translation stages for the translation of N control entries of one of the queued prefetch requests into a translated prefetch request, wherein a translation in an i-th translation stage is dependent on a translation in an (i−1)-th translation stage, i∈[1, . . . , N], and a prefetch issuer which is configured to control an index for each of the N different control entries in the prefetch queue and to issue a prefetch of the indexed control entry of the N different control entries for the highest non-stalled translation stage.

The present multi-stage translation of prefetch requests provides an improved prefetching scheme, because it is not necessary to drop translation prefetches in case of cache misses. Furthermore, resource requirements may be not increased significantly.

According to some implementations, the prefetch of the i-th indexed control entry of a prefetch request includes the i-th indexed control entry of the prefetch request and all j-th control entries of the prefetch request, where j∈[1, . . . , i−1]. In an embodiment, each of the queued prefetch requests includes a respective value (instance) of the N different control entries. In a further embodiment, each translation stage of the N serial-connected translation stages has an allocated cache for caching its translations.

In a further embodiment, the N control entries include N disjunct address parts of a data packet. For example, a virtual address may be translated into a real address or system address. Therefore, by means of the present multi-stage translation scheme, translations from virtual addresses to real addresses may be prefetched in an advantageous manner. Thus, the performance may be improved by reducing address translation miss stalls in the translator unit in spite of missing spatial locality of the addresses in the request from a coupled I/O device.

In a further embodiment, the index of the highest translation stage of the N serial-connected translation stages is coupled to a head of the prefetch queue. In a further embodiment, the prefetch issuer is configured to control the indices for prefetches for the N−1 lower translation stages of the N serial-connected translation stages.

In a further embodiment, the i-th translation stage is configured to receive the translation from the (i−1)-th translation stage and the control entries associated with the i-th translation stage and the following N−1 translation stages, respectively. In a further embodiment, the i-th translation stage has at least N−1 allocated conflict slots. For the example that N=3, the lowest translation stage may have two allocated conflict slots, the central translation stage may have one conflict slot and the highest translation stage may have none conflict slot. For example, the conflict slots may be separated for posted requests and for non-posted requests.

In a further embodiment, the i-th translation stage is configured to detect a cache miss in its allocated cache and to send a stall indication to the prefetch issuer, signalling a stall for the translation stage the prefetch request was targeted for. In a further embodiment, the prefetch issuer includes a multiplexer coupled between the prefetch queue and the lowest translation stage of the N serial-connected translation stages and a controller for controlling the multiplexer such that the prefetch of the indexed control entry of the N different control entries for the highest non-stalled translation stage is issued from the prefetch queue to the lowest translation stage.

In a further embodiment, the prefetch issuer includes N−1 counters for managing the indices for prefetches for the N−1 lower translation stages of the N serial-connected translation stages.

In a further embodiment, the prefetch issuer is configured to issue a prefetch of the indexed control entry for the highest non-stalled translation stage with an update of the least recently used (LRU) position in the highest non-stalled translation stage, if the index of the control entry associated with the highest non-stalled translation stage corresponds to the index of the control entry associated with the translation stage below the highest non-stalled translation stage.

In a further embodiment, the prefetch issuer is configured to issue a prefetch of the indexed control entry for the highest non-stalled translation stage without an update of the least recently used (LRU) position in the highest non-stalled translation stage, if the index of the control entry associated with the highest non-stalled translation stage is greater than the index of the control entry associated with the translation stage below the highest non-stalled translation stage.

The respective means, e.g., the prefetch issuer, may be implemented in hardware and/or in software. If the means are implemented in hardware, it may be embodied as a device, e.g., as a computer or as a processor or as a part of a system, e.g., a computer system. If the means are implemented in software it may be embodied as a computer program product, as a function, as a routine, as a program code or as an executable object.

Any embodiment of the first aspect may be combined with any embodiment of the first aspect to obtain another embodiment of the first aspect.

According to a second aspect, an I/O controller for a processing unit is suggested, wherein the I/O controller is coupled to a processing unit and to a memory, wherein the I/O controller includes a device for multi-stage translation of prefetch requests according the above mentioned first aspect.

According to a third aspect, a method for multi-stage translation of prefetch requests is suggested. The method includes the following operations:

In a first operation, queued prefetch requests different control entries are provided by a prefetch queue, wherein each of the queued prefetch requests includes N different control entries. In a second operation, N control entries of one of the queued prefetch requests are translated into a translated prefetch request by N serial-connected translation stages, wherein a translation in a i-th translation stage is dependent on a translation in a (i−1)-th translation stage, i∈[1, . . . , N]. Within the second operation, an index for each of the N different control entries in the prefetch queue is controlled, and a prefetch of the indexed control entry of the N different control entries for the highest non-stalled translation stage is issued.

According to a fourth aspect, the invention relates to a computer program comprising a program code for executing the method of the third aspect for multi-stage translation of prefetch requests when run on at least one computer.

In the following, exemplary embodiments of the present invention are described with reference to the enclosed figures.

In FIG. 1, a schematic block diagram of a first embodiment of a device 100 for multi-stage translation of prefetch requests is depicted. The device 100 of FIG. 1 comprises a prefetch queue 200, N serial-connected translation stages 301, 302 and a prefetch issuer 400. Without loss of generality, N=2 in FIG. 1. Thus, the device 100 of FIG. 1 has a first translation stage 301 coupled to the prefetch queue 200 and a second translation stage 302 coupled to the first translation stage 301.

The prefetch queue 200 is adapted to provide queued prefetch requests R1-R4, each of the queued prefetch requests R1-R4 including N different control entries n1, n2, (N=2). The two serial-connected translation stages 301, 302 are adapted to translate the N control entries n1, n2 of one of the queued prefetch requests into a translated prefetch request n12, wherein a translation in the second translation stage 302 is dependent on a translation in the first translation stage 301.

In other words, the device 100 of FIG. 1 provides a two-level translation with the translation stages 301, 302 which translate the input 2-tuple n1, n2 into the output information n12. Each translation stage 301, 302 has an allocated cache 501, 502 for caching its translations. As indicated above, the translations are dependent between the different translation stages 301, 302 such that the full translation of all the previous stages (in the embodiment of FIG. 1 only one) is needed to make a translation in a certain stage. For example, in most cases, the later translation stages have higher missrates than the lower stages. In the PCI express example, for instance, address translation misses (second stage) are much more frequent than Request ID translation misses (first stage).

If a translation prefetch encounters a miss in one stage (or level), it needs to stall until the data has been installed in the allocated cache. Only then, it may make forward progress to the next stage. If it is not stalled, but discarded because of resource contention, it may install the missing entry in the allocated cache and initialize the prefetch if there are resources available to handle the fetch, but it may not prefetch translation information that is potentially missing in a higher translation stage.

If a further prefetch request arrives at the same translation stage 301, 302, while there is already a stalled request pending, it may either proceed if it has a cache hit, or it needs to be buffered as well in case it also encounters a translation miss. If it cannot be buffered, as for the first request, it may be dropped either with or without initiating a prefetch. Depending on the cache hit characteristics of the incoming requests R1-R4, a larger number of stall resources may be needed between the different translation stages 301, 302.

In order to reduce this overhead and taking advantage of the fact that lower translation stages of the translation frequently have higher cache hit rates, the present device 100 includes a prefetch issuer 400 which is configured to control an index I1 for at least one of the N different control entries n1, n2 in the prefetch queue 200 and to issue a prefetch of the index control entry I1, I2 of the different control entries n1, n2 for the highest non-stalled translation stage 301, 302. Thus, the prefetch queue 200 can be used to create partial prefetch requests of input data n1, n2 that are similar to requests that have to be dropped in a translation stage because of a cache miss and unavailable stall resources that allocate the missing entry in the according translation stage 301, 302 with the difference that the full request R1-R4 will be reissued again when the prefetch resource contention of the according translation stage 301, 302 has been resolved. Therefore, the prefetch can still initiate the necessary prefetch requests in the caches 501, 502 in all the translation stages 301, 302.

Figure 2:
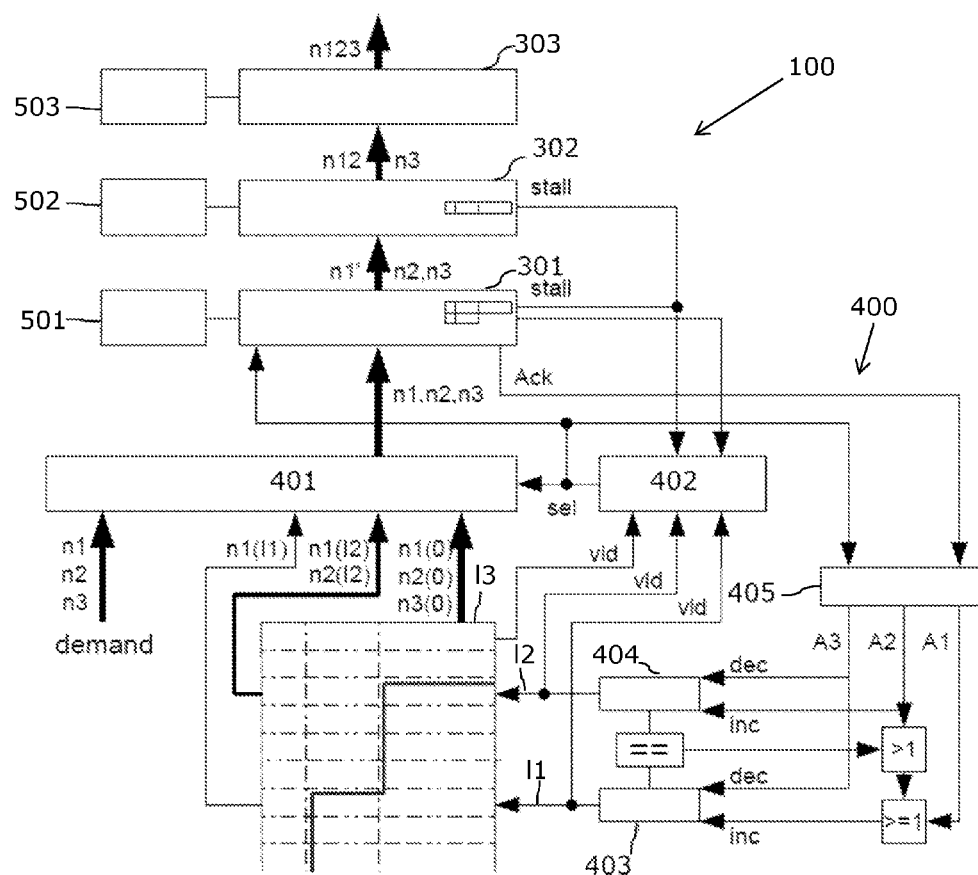
FIG. 2 shows a schematic block diagram of a second embodiment of a device for multi-stage translation of prefetch requests.

By use of the prefetch issuer 400, the prefetch queue 200 can be used with multiple indexes (see FIG. 2 particularly). The index I2 for the highest Translation stage is coupled to the head of the prefetch queue. The indexes for the other translation stages are variable and depend on the actual cache hits of the prefetch requests. In the embodiment of FIG. 1, these other stages include only the first translation stage 301, in the embodiment of FIG. 2, these other stages include the first translation stage 301 and the second translation stage 302.

More general, the prefetch issuer 400 is configured to control the indices I1, I2 of the N−1 lower translation stages 301 of the N serial-connected translation stages 301, 302. Furthermore, the second translation stage 302 is configured to receive the translation n1' from the first translation stage 301 and the control entry n2 associated with the second translation stage 302.

Further, the first translation stage 301 has one allocated conflict slot. In this regard, the first translation stage 301 is configured to detect a cache miss in its allocated cache 501 and to send a stall indication "stall" to the prefetch issuer 400, signaling a stall for the translation stage the prefetch request was targeted for.

Further, with respect to FIG. 1, the prefetch issuer 400 includes a multiplexer 401 between the prefetch queue 200 and the first translation stage 301 and a controller 402 for controlling the multiplexer 401 such that the indexed control entry I1, I2 for the N different control entries n1, n2 for the highest non-stalled translation stage 301, 302 is prefetched from the prefetch queue 200 to the first translation stage 301. The multiplexer 401 may be also used for demand requests n1, n2. The controller 402 may also be called prioritizer, because it prioritizes the partial request taken from the prefetch queue 200. Further, in the example of FIG. 1, the prefetch issuer 400 includes one counter 403 for managing the index I1 of the first translation stage 301.

The counter 403 is coupled to an acknowledge selector 405 which is configured to receive an acknowledge from the first translation stage 301 and the selection indication sel from the controller 402. The controller 403 outputs the index I1 for controlling the prefetch queue 200.

FIG. 2 shows a schematic block diagram of a second embodiment of a device 100 for a multi-stage translation of prefetch requests. The second embodiment of FIG. 2 is based on the first embodiment of FIG. 1, but shows a 3-level translation of prefetch requests instead of a 2-level translation as depicted in FIG. 1. Thus, the input tuple n1, n2, n3 of FIG. 2 is translated to the output n123 being the output of the highest translation stage 303, here the third translation stage 303. The index I3 of the highest translation stage 303 is coupled to the head of the prefetch queue 200. The prefetch issuer 400 is configured to control the indices I1, I2 of the two lower translation stages 301, 302.

The first translation stage 301 receives the input n1, n2, n3 as provided by the prefetch queue 200. The second translation stage 302 receives the translation n1' from the first translation stage 301 and the two further control entries n1, n2. Correspondingly, the third and highest translation stage 303 receives the translation n12 from the second translation stage 302 and the third control entry n3 is associated with the third translation stage 303. The first translation stage 301 has furthermore two allocated conflict slots. Correspondingly, the second translation stage has one allocated conflict slot. The first translation stage 301 and the second translation stage 302 are configured to detect a cache miss in the allocated cache 501, 502 to send a stall indication "stall" to the prefetch issuer 400 in a case that a cache miss is detected, signaling a stall for the translation stage the prefetch was targeted for. In contrast to FIG. 1, the prefetch issuer 400 of FIG. 2 includes not only one, but two counters 403, 404 for managing the indices I1, I2 of the two lower translation stages 301, 302 of the three serial-connected translation stages 301-303.

Furthermore, the prefetch issuer 400 is configured to issue a prefetch of the indexed control entry I1, I2 for the highest non-stalled translation stage 301, 302 with an update of the least recently used (LRU) position in the highest non-stalled translation stage 301, 302, if the index I1, I2 of the control entry n1, n2 associated with the highest non-stalled translation stage 301, 302 corresponds to the index I1, I2 of the control entry n1, n2 associated with the translation stage 301, 302 below the highest non-stalled translation stage 302, 303. In an analogous way, for the case that the index I1, I2 of the control entry n1, n2 associated with the highest non-stalled translation stage is greater than the index of the control entry associated with the translation stage below the highest non-stalled translation stage, the prefetch issuer 400 may issue a prefetch of the index control entry I1, I2 for the highest non-stalled translation stage 301, 302 without an update of the LRU in the highest non-stalled translation stage.

The present device 100 of FIG. 1 or FIG. 2 may be part of the I/O controller of the European Patent Application 11195663.7, its disclosure is incorporated by reference. In particular, the present device may be embodied by the I/O controller of FIG. 1 of the European Patent Application 11195663.7.

Figure 3:
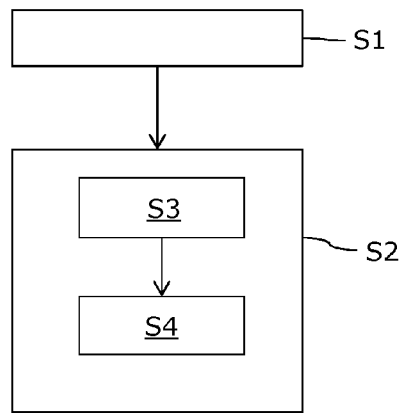
FIG. 3 shows a first embodiment of a sequence of method operations for multi-stage translation of prefetch requests.

In FIG. 3, a first embodiment of a sequence of method operations for multi-stage translation of prefetch requests is shown. The method includes operations S1-S4, wherein operation S2 may comprise the operations S3 and S4. In operation S1, queued prefetch requests R1-R4 are provided by a prefetch queue 200, wherein each of the queued prefetch requests R1-R4 includes N different control entries n1, n2, n3. In operation S2, N control entries n1, n2, n3 of one of the queued prefetch requests R1-R4 are translated into a translated prefetch request n123 by N serial-connected translation stages 301-303, wherein a translation in an i-th translation stage is dependent in an (i−1)-th translation stage, i$\in$[1, . . . , N]. In operation S3, an index I1-I3 for each of the N different control entries n1-n3 in the prefetch queue is controlled. In operation S4, a prefetch of the indexed control entry n1-n3 for the highest non-stalled translation stage 301-303 is issued.

Figure 4:
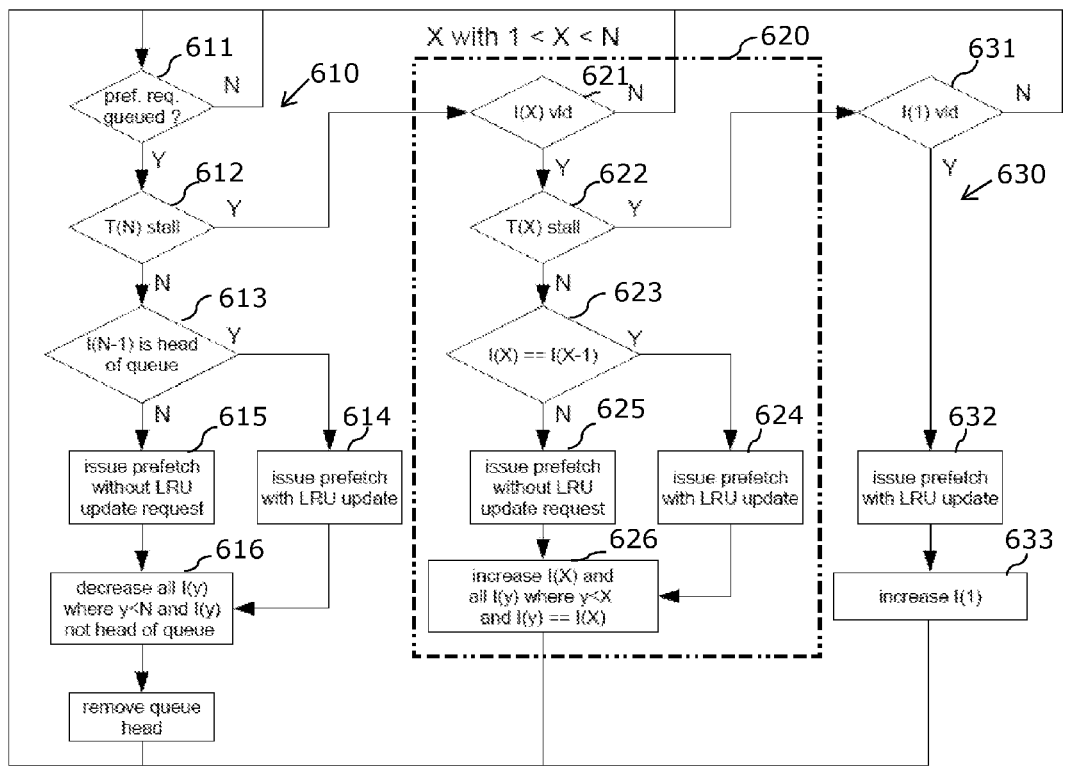
FIG. 4 shows a second embodiment of a sequence of method operations for multi-stage translation of prefetch requests.

In FIG. 4, a second embodiment of a sequence of method operations for multi-stage translation of prefetch requests is depicted. In this regard, FIG. 4 shows the general case for an N-stage translation. The left part 610 of FIG. 4 is provided for the highest translation stage of the N translation stages. The right part 630 is provided for the lowest translation stage of the N translation stages. Further, the part 620 is provided N−2 times and represents the N−2 central translation stages between the highest translation stage and the lowest translation stage.

Now, the details to the single operations of FIG. 4 are described:

In this regard, it shall be noted that a "Y" indicates a Yes, and an "N" indicates a No. In block 611, it is checked if a prefetch request is queued in the prefetch queue. In block 612, it is checked if the highest translation stage T (N) is stalled. If it is not stalled, the method proceeds with block 613. In block 613, it is checked if the index I (N−1) is the head of the prefetch queue. If this is true, the method proceeds with block 614, otherwise with block 615. In block 614, the prefetch is issued together with an LRU update in the cache allocated to the highest translation stage. In block 615, the prefetch is issued without an LRU update. In the following block 616, all indexes I(y) are decreased, where y<N, if they are not pointing to the head of the queue.

In block 617, the prefetch request is removed from the queue head. If block 612 is true, the method proceeds with part 620 for the N−2 central translation stages X, particularly with block 621. In block 621 it is checked if the index I(X) is valid. If it is valid, the method proceeds with block 622. In block 622 it is checked if the associated translation stage T(X) is stalled. If this is not true, the method proceeds with block 623. In block 623 it is checked if I(X)==I(X−1). If it is true, the method proceeds with block 624, otherwise with block 625. In block 624, the prefetch is issued together with an LRU update in the cache allocated to the N-th translation stage. In block 625, the prefetch is issued without an LRU update.

Then, the method proceeds with block 626, where the index I(X) is increased and all I(y) are increased, where y<X and I(y)==I(X). If block 622 is true, the method proceeds with block 630, in particular with block 631. In block 631, it is checked if the index I(1) is valid (vld). If this is not true, the method proceeds with block 611. If this is true, the method proceeds with block 632. In block 632, the prefetch is issued with an LRU update. In block 633, the index I(1) is increased, and the method proceeds with block 611.

Computerized devices may be suitably designed for implementing embodiments of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one operation or all operations of above method of FIG. 3 or 4 may be implemented in software, as an executable program, the latter executed by suitable digital processing devices. More generally, embodiments of the present invention may be implemented wherein general-purpose digital computers, such as personal computers, workstations, etc., are used.

Figure 5:
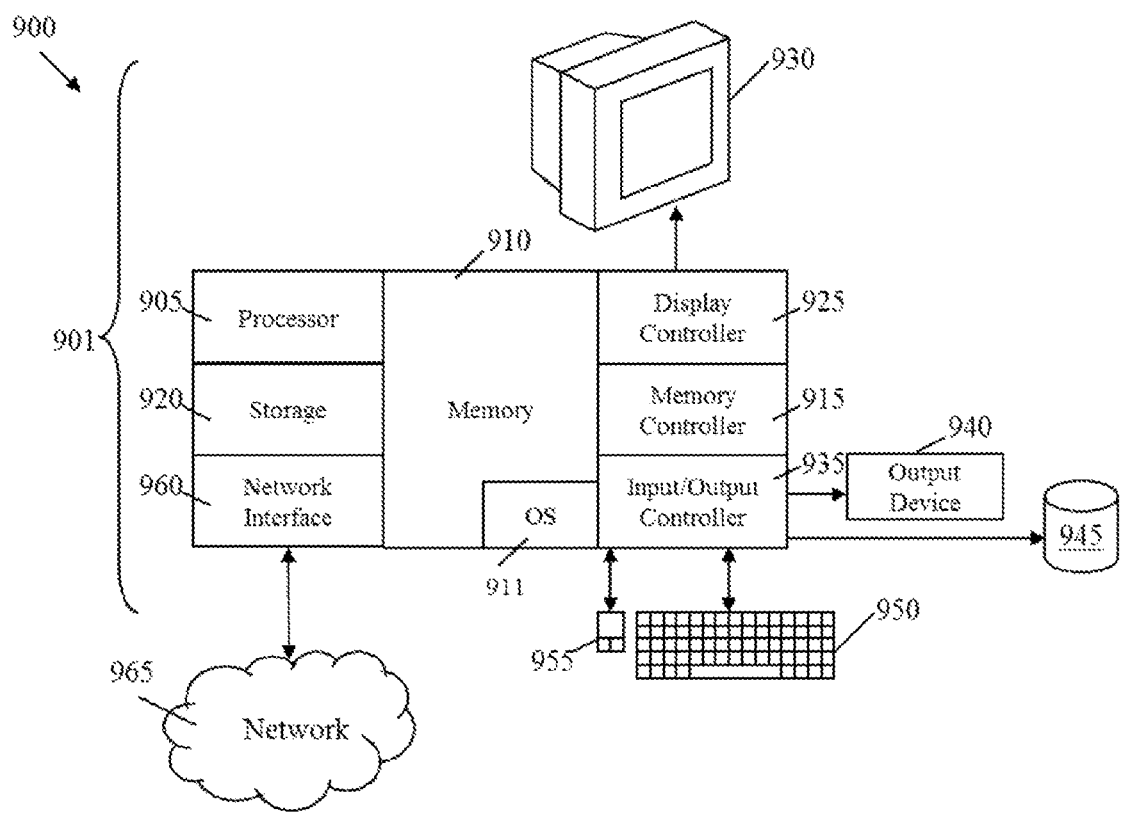
FIG. 5 shows a schematic block diagram of an embodiment of a system adapted for multi-stage translation of prefetch requests.

For instance, the system 900 depicted in FIG. 5 schematically represents a computerized unit 901, e.g., a general-purpose computer. In exemplary embodiments, in terms of hardware architecture, as shown in FIG. 5, the unit 901 includes a processor 905, memory 910 coupled to a memory controller 915, and one or more input and/or output (I/O) devices 940, 945, 950, 955 (or peripherals) that are communicatively coupled via a local input/output controller 935. The input/output controller 935 may embody an I/O controller including the device of FIG. 1 or FIG. 2. Further, the input/output controller 935 may be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 may be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 may include any one or combination of volatile memory elements (e.g., random access memory) and nonvolatile memory elements. Moreover, the memory 910 may incorporate electronic, magnetic, optical, and/or other types of storage media. Note that the memory 910 may have a distributed architecture, where various components are situated remote from one another, but may be accessed by the processor 905.

The software in memory 910 may include one or more separate programs, each of which comprises an ordered listing of executable instructions for implementing logical functions. In the example of FIG. 5, the software in the memory 910 includes methods described herein in accordance with exemplary embodiments and a suitable operating system (OS) 911. The OS 911 essentially controls the execution of other computer programs, such as the methods as described herein (e.g., FIG. 3 or FIG. 4), and provides scheduling, input-output control, file and data management, memory management, and communication control and related services. For example, the interface 1 may be embodied in the OS 911.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods may be written as an object oriented programming language, which has classes of data and methods, or a procedure programming language, which has routines, subroutines, and/or functions.

Possibly, a conventional keyboard 950 and mouse 955 may be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 may further include a display controller 925 coupled to a display 930. In exemplary embodiments, the system 900 may further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 may also be an IP-based network for communication between the unit 901 and any external server, client and the like via a broadband connection. In exemplary embodiments, network 965 may be a managed IP network administered by a service provider. Besides, the network 965 may be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS may be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g., with reference to FIG. 3 or 4) are implemented in software, the methods may be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

The invention claimed is:

1. A device for multi-stage translation of prefetch requests, the device comprising:
   a prefetch queue for providing queued prefetch requests, each of the queued prefetch requests including N different control entries;
   N serial-connected translation stages for the translation of N control entries of one of the queued prefetch requests into a translated prefetch request, wherein a translation in a i-th translation stage is dependent on a translation in a (i−1)-th translation stage, i∈[1, . . . , N]; and
   a prefetch issuer which is configured to control an index for each of the N different control entries in the prefetch queue and to issue a prefetch of the indexed control entry of the N different control entries for the highest non-stalled translation stage.

2. The device of claim 1, wherein each translation stage of the N serial-connected translation stages has an allocated cache for caching its translations.

3. The device of claim 1, wherein the N control entries include N disjunct address parts of a data packet.

4. The device of claim 1, wherein the index of the highest translation stage of the N serial-connected translation stages is coupled to a head of the prefetch queue.

5. The device of claim 1, wherein the prefetch issuer is configured to control the indices for prefetches for the N−1 lower translation stages of the N serial-connected translation stages.

6. The device of claim 1, wherein the i-th translation stage is configured to receive the translation from the (i−1)-th translation stage and the control entries associated with the i-th translation stage and the following N−i translation stages, respectively.

7. The device of claim 6, wherein the i-th translation stage has at least N−i allocated conflict slots.

8. The device of claim 7, wherein the i-th translation stage is configured to detect a cache miss in its allocated cache and to send a stall indication to the prefetch issuer, signalling a stall for the translation stage the prefetch request was targeted for.

9. The device of claim 1, wherein the prefetch issuer includes a multiplexer coupled between the prefetch queue and the lowest translation stage of the N serial-connected translation stages and a controller for controlling the multiplexer such that the prefetch of the indexed control entry of the N different control entries for the highest non-stalled translation stage is issued from the prefetch queue to the lowest translation stage.

10. The device of claim 1, wherein the prefetch issuer includes N−1 counters for managing the indices for prefetches for the N−1 lower translation stages of the N serial-connected translation stages.

11. The device of claim 1, wherein the prefetch issuer is configured to issue a prefetch of the indexed control entry for the highest non-stalled translation stage with an update of the least recently used position in the highest non-stalled translation stage, if the index of the control entry associated with the highest non-stalled translation stage corresponds to the index of the control entry associated with the translation stage below the highest non-stalled translation stage.

12. The device of claim 1, wherein the prefetch issuer is configured to issue a prefetch of the indexed control entry for the highest non-stalled translation stage without an update of the least recently used position in the highest non-stalled translation stage, if the index of the control entry associated with the highest non-stalled translation stage is greater than the index of the control entry associated with the translation stage below the highest non-stalled translation stage.

13. An I/O controller for a processing unit, wherein the I/O controller is coupled to the processing unit and to a memory, wherein the I/O controller includes a device of claim 1.

14. A method for multi-stage translation of prefetch requests, the method comprising:
- providing queued prefetch requests by a prefetch queue, wherein each of the queued prefetch requests including N different control entries;
- translating N control entries of one of the queued prefetch requests into a translated prefetch request by N serial-connected translation stages, wherein a translation in an i-th translation stage is dependent on a translation in an (i−1)-th translation stage, $i \in [1, \ldots, N]$;
- controlling an index for each of the N different control entries in the prefetch queue, and
- issuing a prefetch of the indexed control entry of the N different control entries for the highest non-stalled translation stage.

15. A computer program comprising a program code for executing the method of claim 14 for multi-stage translation of prefetch requests when run on at least one computer.

* * * * *